(Model.)

F. BORNTRAGER.
WAGON.

No. 245,123.  Patented Aug. 2, 1881.

WITNESSES:
Chas. Nida
C. Sedgwick

INVENTOR:
F. Borntrager
BY Munn & Co
ATTORNEYS.

UNITED STATES PATENT OFFICE.

FREDRICK BORNTRAGER, OF ST. CLAIR, MICHIGAN.

WAGON.

SPECIFICATION forming part of Letters Patent No. 245,123, dated August 2, 1881.

Application filed May 17, 1881. (Model.)

*To all whom it may concern:*

Be it known that I, FREDRICK BORNTRAGER, of St. Clair city, county of St. Clair, and State of Michigan, have invented certain useful Improvements in Wagons, of which the following is a specification.

My invention relates to that class of wagons which have jointed reaches for enabling the wagon to be turned within a small compass; and it has for its object the production of a wagon of this character which shall be strong, durable, and easily adjusted to different length, and one the bolsters of which shall not be unnecessarily elevated, as heretofore.

The invention consists in fitting the rear hounds of the wagon in and upon the top of the axle and forming them with rear extensions for supporting the bolster when the rear wheels are turned pivotally, thus dispensing with the necessity of a rear sand-board; in constructing the forward ends of the rear hounds so as to permit the rear reach to be adjusted as to length between them, the rear end of said reach being secured by a king-bolt passing through the rear axle and through a broad staple or plate placed over the reach and bolted to the axle; and in the construction and arrangement of parts, as hereinafter fully described.

In the accompanying drawings, Figure 1 is a plan view of my invention. Fig. 2 is a longitudinal section thereof, taken on line $x$ $x$ of Fig. 1; and Fig. 3 is a cross-section taken on the line $y$ $y$ of Fig. 2.

Similar letters of reference indicate corresponding parts.

The forward truck of the wagon is of the usual construction, save that the forward reach, C, is secured rigidly to the center of the sway-bar, and that the front sand-board is cut away at $c$ to admit the metal forward end of the main reach A to the forward king-bolt. The axle B of the rear truck has the curved bars $a$ $a$ secured in and upon it, which bars constitute the rear hounds. These bars are secured together a short distance apart, at their forward ends, by the metal plates $a'$ $a'$, and their rear ends, $b$ $b$, are extended beyond the axle, and these rear ends are curved and are faced with the metal plates $e$ $e$, so as to form ways for the pivotal movement of the axle in turning the wagon, and supports for the bolster E.

The rear reach, D, is attached to the reach C by the bolt $i''$ passing through the elongated opening or slot $d$, and the rear end of this reach passes between the forward ends of the rear hounds and the upper and lower plates, $a'$ $a'$, as shown in the drawings, and is provided with suitable holes for the passage of the rear king-bolt. To hold the end of the reach D in place and to prevent contact thereof with the bolster E, I provide the metal staple or plate $h$, placed above it and secured to the axle by the through arms or bolts $h'$ $h'$, which are provided with nuts upon the under side of the axle.

The rear end of the main reach A passes through the bolster E, and is provided with holes for the king-bolt, corresponding with the holes through the reach D, for lengthening and shortening the wagon.

The bottom of the bolster E is faced with the metal plate $i'$, which comes in contact with the plates $e$ $e$ upon the rear hounds and prevents rapid wear of the bolster. When the rear axle is turned out of line with the bolster to the right or left the ends of the bolster are supported by the rear extension of the hounds in rear of the axle, thus preventing at all times lateral strain upon the king-bolt. The metal staple or plate $h$, besides serving to retain the rear reach in place on the axle, serves also as a support for the king-bolt in the center, thus lessening the liability of the bolt becoming bent.

Having thus fully described my invention, I claim as new and desire to secure by Letters Patent—

1. The rear hounds formed with the extensions $b$ $b$ beyond the axle, in combination with the bolster E, resting upon the hounds, as and for the purposes specified.

2. The plate $h$, provided with the arms $h'$ $h'$, which pass through the axle, in combination with the bolster E and the reaches A D, the bolster being provided with the plate $i$, substantially as and for the purpose set forth.

FREDRICK BORNTRAGER.

Witnesses:
GEORGE BEYSCHLAY,
WM. F. LEACH.